A. HEIM.
BALING PRESS.
APPLICATION FILED MAY 2, 1910.

990,652.

Patented Apr. 25, 1911.

WITNESSES:
W. M. Gentle
O. M. McLaughlin

INVENTOR.
Adam Heim.
BY
V. H. Lockwood
ATTORNEY

A. HEIM.
BALING PRESS.
APPLICATION FILED MAY 2, 1910.

990,652.

Patented Apr. 25, 1911.
9 SHEETS—SHEET 2.

WITNESSES:
W. M. Gentle
O. M. McLaughlin

INVENTOR.
Adam Heim.
BY
V. H. Lockwood
ATTORNEY.

A. HEIM.
BALING PRESS.
APPLICATION FILED MAY 2, 1910.

990,652.

Patented Apr. 25, 1911.
9 SHEETS—SHEET 3.

WITNESSES:
W. M. Gentle
O. M. McLaughlin

INVENTOR.
Adam Heim.
BY
V. H. Lockwood
ATTORNEY.

A. HEIM.
BALING PRESS.
APPLICATION FILED MAY 2, 1910.

990,652.

Patented Apr. 25, 1911.

WITNESSES:
W. M. Gentle.
O. M. McLaughlin

INVENTOR.
Adam Heim.
BY
V. H. Lockwood
ATTORNEY.

A. HEIM.
BALING PRESS.
APPLICATION FILED MAY 2, 1910.

990,652.

Patented Apr. 25, 1911.
9 SHEETS—SHEET 6.

WITNESSES:
W. M. Gentle
O. M. McLaughlin

INVENTOR.
Adam Heim.
BY
V. H. Lockwood
ATTORNEY.

A. HEIM.
BALING PRESS.
APPLICATION FILED MAY 2, 1910.

990,652.

Patented Apr. 25, 1911.

WITNESSES:
W. M. Gentle
O. M. McLaughlin

INVENTOR.
Adam Heim.
BY
V. H. Lockwood
ATTORNEY.

A. HEIM.
BALING PRESS.
APPLICATION FILED MAY 2, 1910.

990,652.

Patented Apr. 25, 1911.
9 SHEETS—SHEET 9.

UNITED STATES PATENT OFFICE.

ADAM HEIM, OF CONNERSVILLE, INDIANA, ASSIGNOR OF ONE-HALF TO BURL EDDY, OF CONNERSVILLE, INDIANA.

BALING-PRESS.

990,652. Specification of Letters Patent. Patented Apr. 25, 1911.

Application filed May 2, 1910. Serial No. 558,804.

*To all whom it may concern:*

Be it known that I, ADAM HEIM, of Connersville, county of Fayette, and State of Indiana, have invented a certain new and useful Baling-Press; and I do hereby declare that the following is a full, clear, and exact description thereof, reference being had to the accompanying drawings.

This invention relates to a baling press wherein the plunger operates continuously and the baling wires are fed in across the baling chamber through slots in the forward portion of the plunger, and the mechanism for feeding the wire and holding and tying it, does not operate excepting at the completion of the bale, and then it is thrown into operation by means actuated or controlled by a bale as it passes through the machine, and a single mechanism or group of parts secured to the side of the frame operates the needles, holds the wires, and twists and ties them.

One object of the invention is to feed the baling wires through the baling chamber by needles which will not come in contact or be interfered with by the hay or material being baled, and to that end the forward portion of the plunger is slotted and the needles pass through the slots in the plunger behind the front face thereof, and therefore escape the hay or material being baled. Means are provided for actuating the plunger and needles, so that they will pass through the plunger while it is near its forward limit of movement, and also the needles will be returned by the time the plunger reaches its rearward limit of movement. After the needles have been inserted through the baling chamber and the plungers withdrawn, the needles can be withdrawn without any interference by the hay or material being baled.

Another object of the invention is to make the device automatic, the mechanism for operating the needles and for holding, twisting and tying the baling wires being started by means actuated by the bales passing through the machine, so that the bales automatically regulate said mechanism, and all this is done with a constantly acting plunger.

The full nature of the invention will be understood from the accompanying drawings and the following description and claims.

In the drawings Fig. 2 is an elevation of the side of the device on which the twister mechanism is mounted. Fig. 20 is a horizontal section through a part of the twisting mechanism of the machine showing one stage of the operation thereof. Fig. 21 is a section through parts of the bale wire or tie from the line 21—21 of Fig. 20.

In detail, the drawings herein show a longitudinally disposed tubular frame 30 that is rectangular in cross section and mounted on supports 31. The sides are formed of plates or any other sort of frame work and provided with openings, as desired. In the central portion of said frame the pressing chamber is located, an opening 33 in the top of the casing leading to said chamber and through which the hay which is to be baled is inserted. On the casing around the opening 33 there is a hopper 34, see Fig. 10. Within the compressing chamber there is a plunger 35 which reciprocates longitudinally of the frame, 36 being the plunger rod which is pivotally connected with the wrist pin 37, which is eccentrically mounted on the gear 38, see Fig. 3. The gear 38 is mounted on the shaft 39, which is mounted at one side of the casing, and on the outside of the casing said shaft carries a bevel gear 40, see the right-hand end of Fig. 2. The gear 38 is driven by the gear 42 on the shaft 43, which is mounted in bearings 44 on the frame. Said shaft 43 carries a driving pulley 45 to which power is transmitted over the belt 46 from any suitable source.

Figure 4:
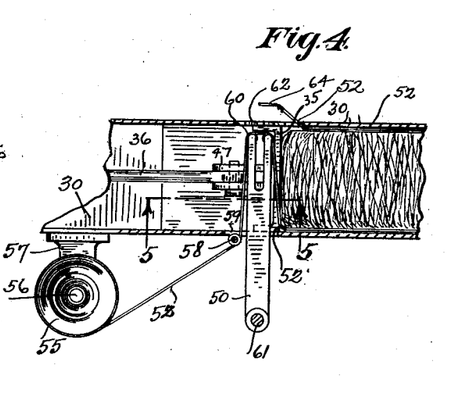
Fig. 4 is a horizontal section through a part of the machine on the line 4—4 of Fig. 3.
Figure 5:
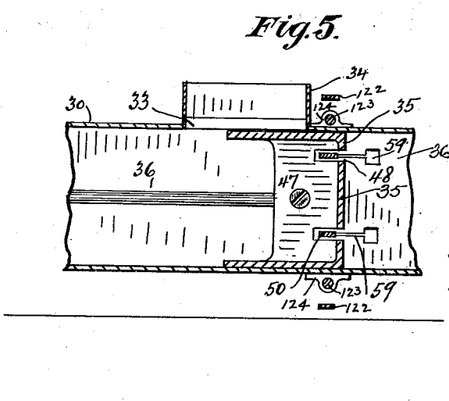
Fig. 5 is a vertical section through a part of the machine on the line 5—5 of Fig. 4.
Figure 10:
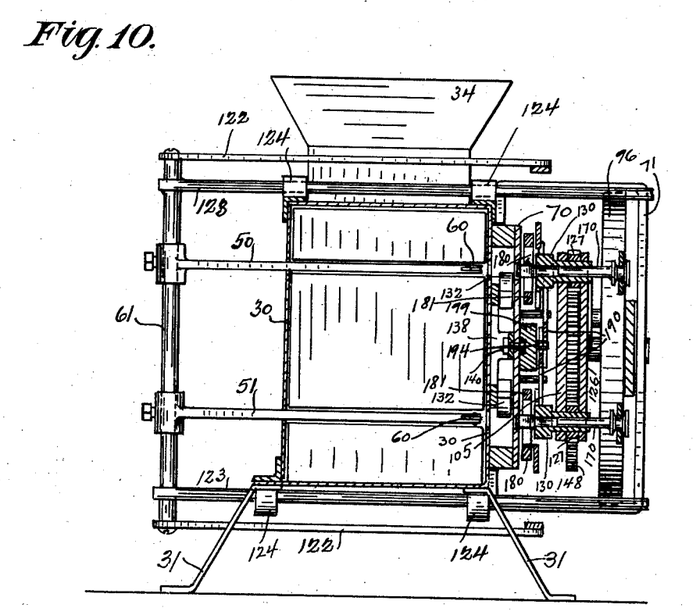
Fig. 10 is a vertical transverse section on the line 10—10 of Fig. 2.

The compressing chamber is shown very well in Fig. 5, and there appears also the plunger 35 in vertical longitudinal section. The plunger has an advancing face or vertical portion, the dimensions of which are substantially equivalent to the transverse area of the compressing chamber, and the bottom and top plates extend rearwardly from said forward plate for a considerable distance, as shown in Fig. 5, substantially as long, at least, as the opening 33 of the hopper, and side plates extend rearwardly from said front plate of the plunger for a slight distance, see Fig. 4, and there is a central vertically disposed web 47 to which the plunger rod is pivoted, as shown in Fig. 5. Transverse slots 48 are provided in the forward portion of the plunger, as shown in Fig. 5, to permit the needles 50 to pass through the same behind the material being baled, these needles being bars, as shown in Figs. 4, 5 and 10. In Figs. 4 and 5 the piston is shown at its forward limit of stroke.

Figure 2:
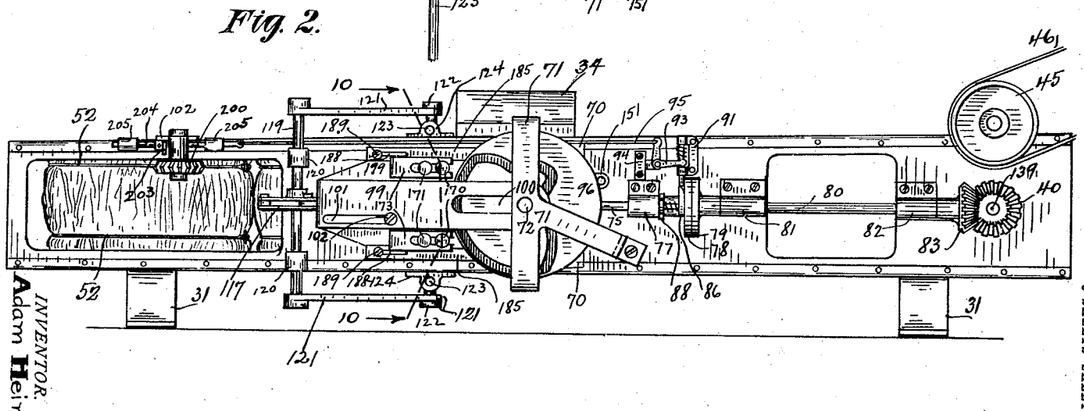
Figure 3:
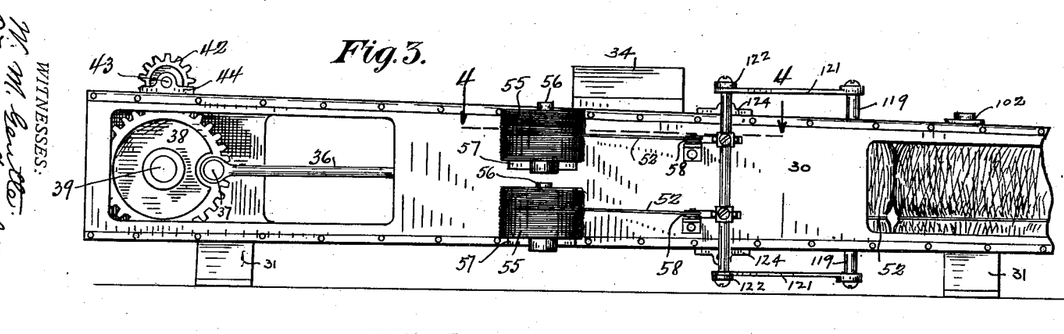
Fig. 3 is an elevation of the other side of the device, one end being broken away.

In operation the hay is thrown into the hopper and therefrom enters the pressing chamber, for as the piston recedes from the position shown in Fig. 5 and to its rearward position, the hay drops into said chamber in front of the piston, and each forward movement of the piston feeds and pushes the bunches of hay against the two bale ties or wires 52, see Figs. 2, 3 and 4.

Figure 23:
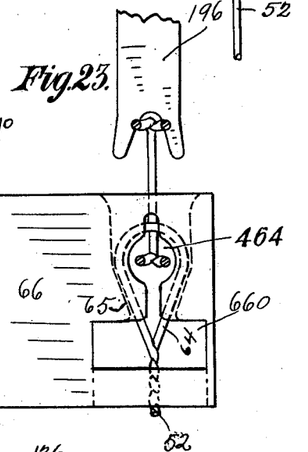
Fig. 23 is a transverse vertical section on the line 23—23 of Fig. 22.

As shown in Figs. 3 and 4, the machine is provided with two reels 55 of wire mounted on removable shafts 56 on brackets 57 secured to one side of the device. One reel is under the other. A strand of wire 52 from each reel passes over a pulley 58 on the side of the frame, as shown in Fig. 4, and through a slot 59 in the side wall of the frame adjacent said pulley and over two small pulleys 60 on the end of the needle bar 50. There are two of these needles 50 horizontally disposed, one above the other, as seen in Fig. 10, and secured at their outer ends to a vertical rod 61. The plan view of one of said bars is shown in Fig. 4, the inner end being bifurcated or having parallel fingers, in the ends of which pulleys 60 are mounted, over which the wire 52 passes. The needles are so situated as to feed the wire in through the pressing compartment of the frame, one near the upper part and one near the lower part thereof, so as to locate the wires or bale ties in the right position with reference to the bale. The number of the needles and bale ties is not necessarily limited to two. The needles reciprocate through slots 59 in one side of the casing, and also through the slot 62 in the other side of the frame, as shown in Fig. 4. The free end of each of the wires 52 is provided with a loop 64 and held by the side walls 65 of the plate 66, see Figs. 23 and 27 and by the bend in each wire as it passes through the slot opening, as shown in Fig. 4. The wire at the bend shown in Fig. 4 engages the edge of the frame plate 30 and tends to bind and be held thereby. Hence the edge of the frame plate 30 and the throated construction shown in Fig. 27 coöperate in holding the looped free end of each wire while the hay is being fed by the plunger against said wires. When the machine is first being started, the free end of the wire can be held by hand while the needles feed it into the twisting mechanism and from the first set of loops 64 thereon.

Figure 1:
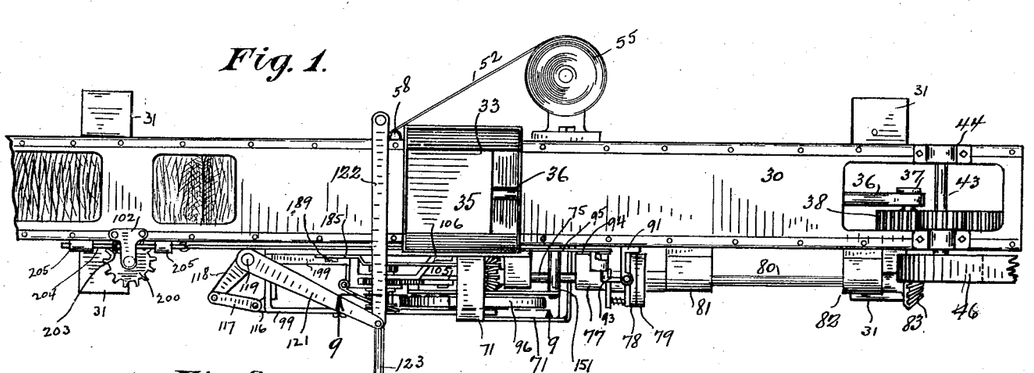
Figure 1 is a plan view of the device, one end being broken away.
Figure 6:
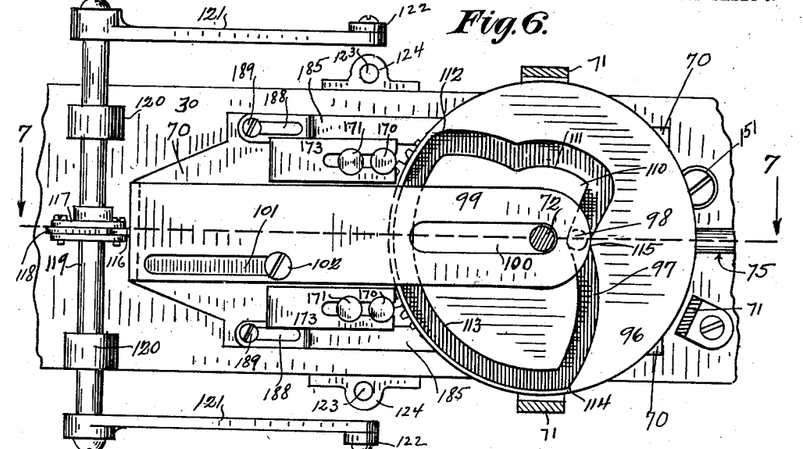
Fig. 6 is a side elevation of a part of the central portion of the machine shown in Fig. 2, but on an enlarged scale.
Figure 7:
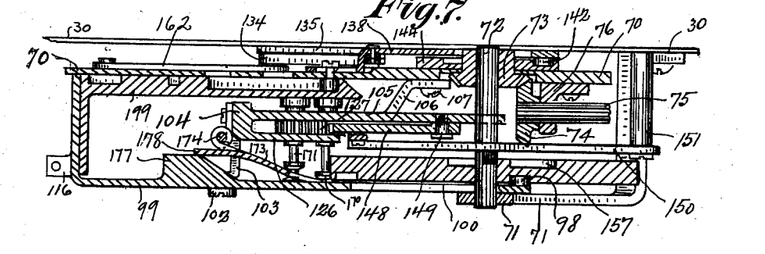
Fig. 7 is a horizontal section through part of the machine on the line 7—7 of Fig. 6.
Figure 12:
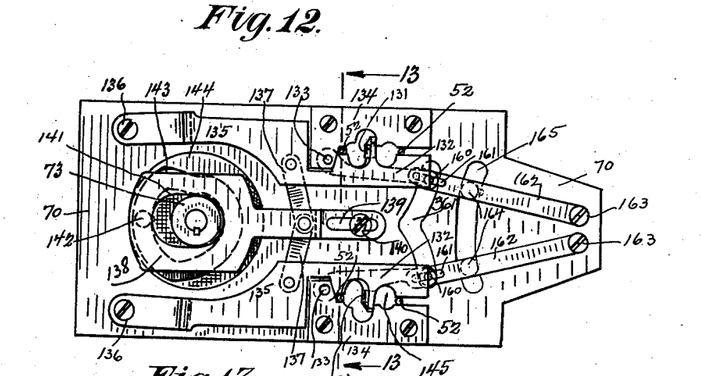
Fig. 12 is the same, showing the parts in position to clamp the bale ties.
Figure 13:
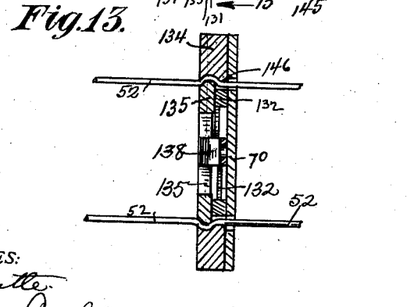
Fig. 13 is a vertical transverse section through the sets of clamps with bale ties or wires clamped in position, said section being on the line 13—13 of Fig. 12.
Figure 16:
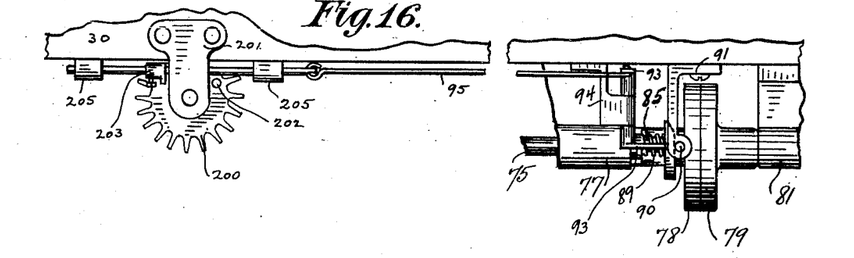
Fig. 16 is a plan view of parts of the machine showing the means for controlling the action of the plungers, parts being broken away.
Figure 17:
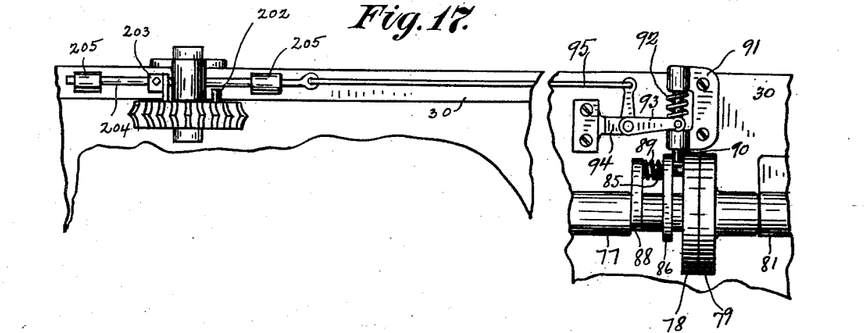
Fig. 17 is a side elevation of the same.
Figure 18:
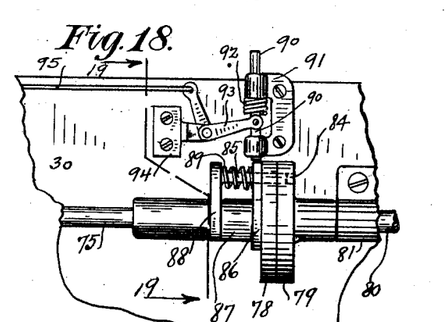
Fig. 18 is the same as the right-hand end of Fig. 17 with the parts in a different stage of operation.
Figure 19:
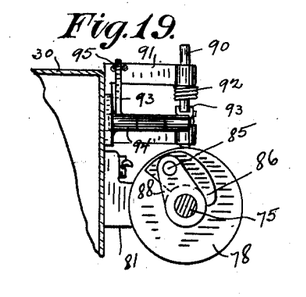
Fig. 19 is a section on the line 19—19 of Fig. 18.
Figures 20, 21:
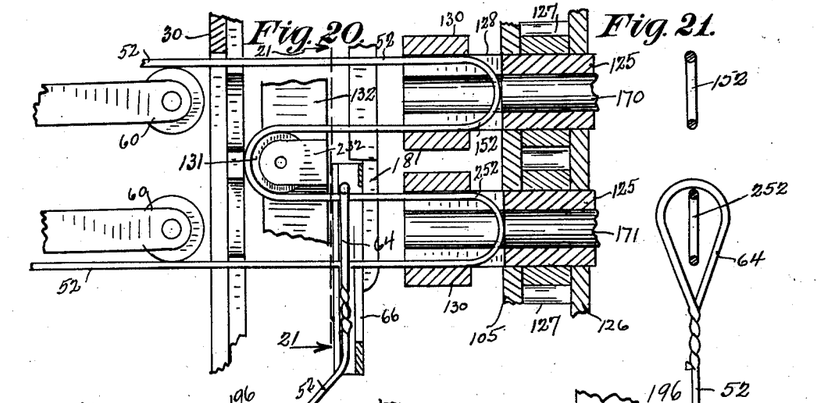
Figure 22:
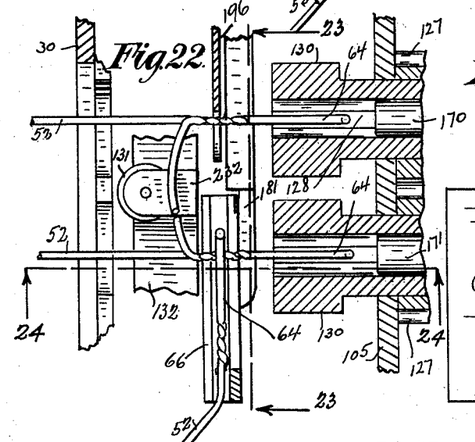
Fig. 22 is the same as Fig. 20 with the parts in a different stage of operation after the wires have been twisted, on the section line 22—22 indicated on Fig. 24.

The needles are reciprocated transversely of the machine and by the following means. On one side of the frame, as appears in Fig. 2, the twisting mechanism is secured having a plate 70, see Fig. 10, to which there is secured a three-armed frame 71, see Fig. 2, and a shaft 72 is mounted in said plate 70 and frame 71 transversely of the machine, which shaft has secured on it a bevel gear 73, see Fig. 7, with which a gear 74 meshes, which latter gear is secured on the shaft 75 mounted in a bearing bracket 76 which is secured to plate 70 and in a bearing 77 on the side of the frame, as shown in Fig. 1. The shaft 75 has a clutch member 78 on it which engages the clutch member 79 on the shaft 80, which is mounted in the bearings 81 and 82 secured to the side of the frame, as shown in Fig. 1. The shaft 80 carries a bevel gear 83, which meshes with a bevel gear 40, see Fig. 2. The shafts 75 and 80 may be said to constitute a divided shaft adapted to be clutched together by the clutch members 78 and 79. This clutch is shown particularly in Figs. 16 to 19. The clutch 79 is rigidly mounted on the shaft 80 and has a pin hole 84 through it, as indicated by dotted lines in Fig. 18 and in position to receive the pin 85 which is carried by the rider 86 on the collar 87, which is secured to the clutch member 78 at one end and to an arm 88 on the other end. The parts 78, 87 and 88 are integral with each other or otherwise secured together, and are fixed on the shaft 75, but the pin 85 is slidable through both the parts 78 and 88 so it may be moved into or out of engagement with the clutch member 79. A spring 89, coiled about the pin 85 and lying between the rider 86 and the arm 88, tends to push the rider 86 to the right, as shown in Fig. 18, and therefore, the pin 85 into the hole 84 in the clutch member 79 and clutching the two shafts together. The pin 85 is withdrawn to unclutch the shafts by a pin 90, see Fig. 17, that is mounted so as to be vertical in a couple of bearings connected with bracket 91, which is secured to the frame 30. The spring 92 on the pin 90 and between the two bars tends to force the pin downwardly and cause it to wedge in between the rider 86 and the clutch member 78 and move the rider 86 to the left, as shown in Fig. 17, and therefore, cause the disengagement of the pin. For that purpose the advancing edge of the rider 86 is beveled, as indicated in Figs. 2 and 16, so that the lower end of the pin 90 will tend to wedge in between the parts 78 and 86. The pin 90 is moved out of the engaging position by the bell crank lever 93, which is mounted on the bracket 94 and is actuated by the rod 95 by the means and in the manner hereafter explained. A cam disk 96 is secured on shaft 72, see Figs. 6 and 7, and in the outside surface thereof there is a cam groove 97, into which the pin 98 projects from a reciprocating frame including a plate 99. This plate has a slot 100, through which the shaft 72 extends, and a slot 101, through which a pin 102 extends from the reciprocating plate 99, which screws into a projection 103 from a frame 104 having a main plate 105 with a tongue 106 secured by the screw 107 to the stationary plate 70. That makes the frame 104 stationary and the pin 102 a guide to coöperate with the shaft 72 in guiding the reciprocation of the plate 99. The frame 99 has an extension 116 to which a link 117 is pivoted at one end, and at the other end said link is pivoted to the outer end of a crank 118 which is secured on a vertical shaft 119 mounted in a bearing 120 extending from one side of the frame, as seen in Fig. 6. Long crank arms 121 are secured to the upper and lower ends of said shaft 119, and their ends are pivoted to connecting bars 122, see Fig. 1, one of said bars being above and the other below said frame of the machine, as shown in Fig. 2, and said bars 122 are pivoted to the rod 61, see Fig. 10. Horizontal guide rods 123 are secured at one end to said rod 61 and are parallel with each other, one above and one below the frame of the machine, and each reciprocates in a pair of bearings 124 mounted on the frame. These guides are for the purpose of holding the rod 61 and the needles in true position at all times. These parts are arranged so that the stroke of the needles will cause them to move to the left from the position shown in Fig. 10 and on the outside of the casing, and on the return stroke they move entirely through and beyond the right-hand side of the casing into the twisting mechanism and into twisters 125, which are shown in Fig. 20. When the needles are pushed in to the limit of movement, they carry the wires 52 to the position shown in Fig. 20, that is, into the twisters 125. These twisters are a pair of parallel tubes 125, which are mounted in the plates 105 and 126 of the frame 104, see Figs. 7, 8 and 24, and between said plates 105 and 126 pinions 127 are secured on the twisters so as to mesh with each other, see Figs. 7 and 22. The ends of the twisters are provided with slots 128 within them and into which the loops or bends of the wires 52 are pushed, as shown in Fig. 20 by the needles. The slotted ends of the twisters are enlarged, as shown at 130 in Fig. 20, so that the slot 128 does not extend entirely through the wall of the twister, but said slots are deep enough to receive and hold the bent wire. As the needle pushes the wire into the position shown in Fig. 20, the portion of the wire extending between the two rollers 60 engages a roller 131 carried by an arm 132, see Fig. 20, pivoted at 133 to the cutter block 134, see Fig. 12. By reason of this construction the double fingered needle is enabled to form two loops in each wire, as shown in Fig. 20, and force said loops into the twisters 125 as the fingers of the needle enter said twisters. Said untwisted loops are numbered 152 and 252 and the lower one 252 is pushed through the twisted loop 64 on the extreme end of the wire 52, and which had been previously formed, see Fig. 21. For this purpose the loop 64 is guided and held by the block 66, as has been heretofore explained. Immediately after the needles have pushed the wires to the position shown in Fig. 20 and formed the loops 152 and 252, the needles recede to about the position shown in Fig. 20, and both strands or parts of the wire 52, as shown in Fig. 20, are engaged by clamps 135 coöperating with the cutter jaws 134, as shown in Figs. 12 and 13. The clamping bars 135 are pivoted on the pin 136 in the plate 70, and are moved into and out of clamping position by toggle bars 137 which are pivoted to said bars 135 and to an intermediate reciprocable bar 138. One end of said bar is slotted at 139, through which the guide pin 140 extends. The other end of the bar 130 is enlarged and has an oblong slot 141 through which the hub of the bevel gear 73 extends, see Figs. 7 and 12, and carries a pin 142 that projects inwardly from an enlarged end of the bar 138, as indicated by dotted lines in Fig. 12, into a cam groove 143 in a cam disk 144 which is mounted rigidly on the hub of the bevel gear 73. The only function of the cam is to reciprocate the bar 138 and through the toggle bars 137 move the clamping bars 135 toward or away from their respective cutter blocks 134 so as to clamp the strands of the wire 52 between them, as indicated in Fig. 12. In that figure both the upper and lower wires 52 are shown and each one is clamped at two points at one side of the enlarged openings 145 between said clamping bars 135 and cutter block 134, through which the fingers of the needle pass. The adjacent edges of the clamping parts 134 and 135 form a cross section, as shown in Fig. 13, that is, the block 134 is much wider than the clamp 135, so that the latter registers with only one portion of the block 134 and from one side of the projection 146. The result of this arrangement is that the wire 52 is kinked where clamped to strengthen the hold of the clamp on the wire. After the wires are clamped by the means described so as to hold the same in the position shown in Fig. 20, the twisters 125 operate to form a couple of twisted loops 64. At the beginning of the twisting operation the loops 152 and 252 are horizontal, as shown in Fig. 20, and the twisters are given two and one-fourth revolutions, so that when stopped the loops are vertically disposed, as shown in Fig. 22. This operation is caused by a segmental gear 148, see Fig. 9, which is substantially semicircular and is secured loosely on a pin 149 in the plate 105 of the frame 104, as shown in Fig. 7. Said gear 148 meshes with one of each pair of pinions 127, so that it drives both sets of pinions simultaneously and to an equal extent. It is actuated by the bar 150 which is fulcrumed on the pin 151 secured to the side of the frame of the machine, and at its other end is pivoted to a pin 153 which screws into the upper end of the connecting rod 154, which at its lower end is pivoted to the pin 155, which screws into the segmental gear 148. The bar 150 intermediate its ends carries a roller or pin 156, which projects into a cam groove 157 in the cam disk 96. The entire cam groove is shown by dotted lines in Fig. 9 and a portion appears in full lines in Fig. 7. The cam groove 157 is largely eccentrically mounted so that it elevates and lowers the free end of the bar 150 and thereby oscillates the segmental gear 148 a sufficient extent to cause the operation of the pinion 127 two and one-fourth revolutions in one direction, and then a reverse movement of similar extent. As the cam wheel 96 travels in the direction of the arrow in Fig. 9, the inner cam surface 257 acting on the pin 156 raises the free end of the arm 150. Thereafter for a certain period there is no movement of the bar 150, because the cam surface 357 is concentrically disposed. Thereafter the outer cam surface 457 forces the bar 150 downwardly to its original position. The twisting movement is caused by the cam surface 257, which causes the upper movement of the bar 150 and gear 148. Before the loops 152 and 252, as shown in Fig. 20, are twisted into the complete form marked 64, as shown in the lower part of Fig. 21, the roller 131 is moved from the position shown in Fig. 20 so as to leave sufficient slack between the two loops 152 and 252 to enable them to be twisted.

Figure 11:
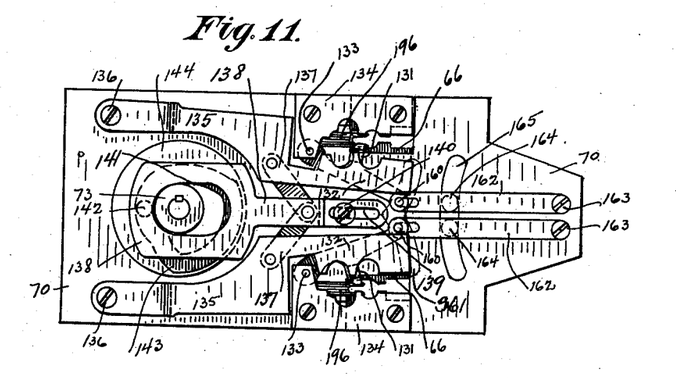
Fig. 11 is an inside elevation of the twisting mechanism, showing the parts in their idle position.
Figure 14:
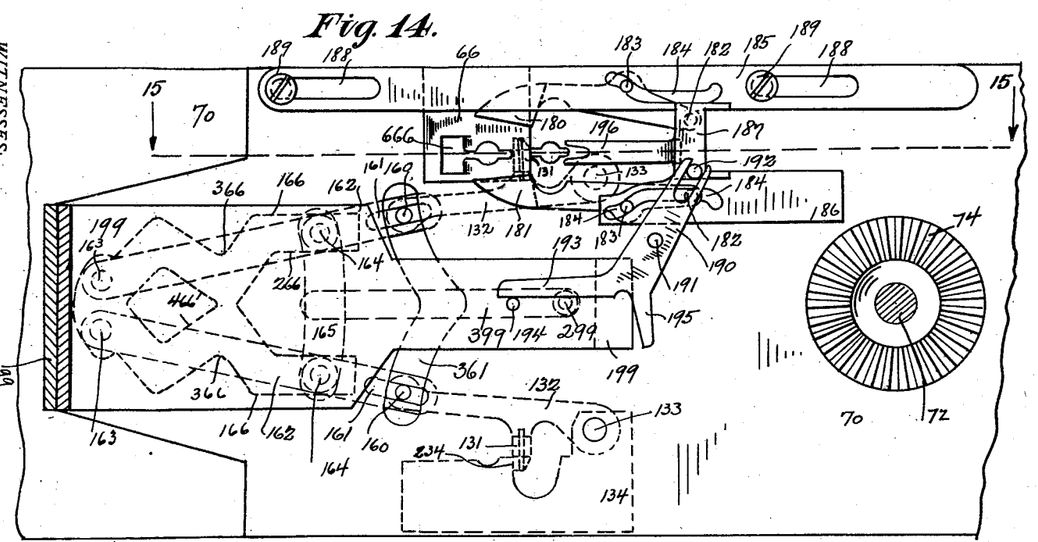
Fig. 14 is a vertical section on the line 14—14 of Fig. 8, showing parts by dotted lines.
Figure 15:
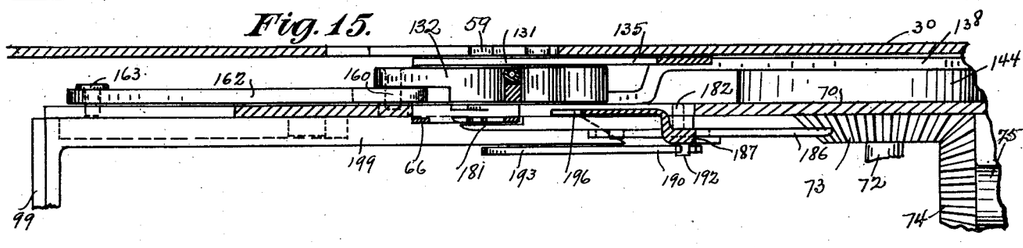
Fig. 15 is a horizontal section on the line 15—15 of Fig. 14.

The means for removing the roller 131 is indicated in Figs. 11, 12, 14 and 15. Figs. 11 and 12 show an inside elevation of plate 70, and Fig. 14 shows an outside elevation of the same. The rollers 131 are mounted on levers 132, which are fulcrumed, as heretofore explained, at one end to the cutter blocks 134 so as to coöperate therewith. The free ends of the levers 132 have pins 160, which project in the slots 161 in the ends of bars 162 fulcrumed to the plate 70 by the pins 163 and also into slot 361 in plate 70. Said bars 162 have pins 164 which project outwardly through the slot 165 in the plate 70, said slot being curved substantially concentrically with the pins 163. The pins 164 preferably carry rollers, as indicated in Fig. 14, and project into cam slots 166, indicated by dotted lines in Fig. 14, said cam slots being in the plate 199 which is secured to the plate 99 so that the two constitute practically a single frame, and which is reciprocated on pin 299 from plate 70 and extending through slot 399 by the cam wheel 96, shown in Fig. 6, and which has heretofore been explained. The cam grooves 166 in the plate 199, indicated by dotted lines in Fig. 14, are so formed as to cause the bars 162 to move toward and away from each other, and, therefore, to cause the levers 132 to move the roller 131 to the position shown in Fig. 20 to engage the wire.

Figure 8:
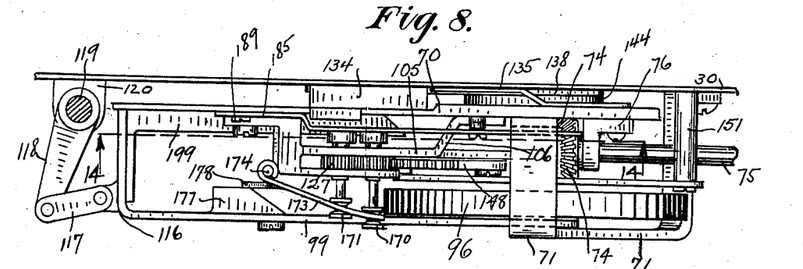
Fig. 8 is a plan view of a part of the machine shown in Fig. 6.
Figure 9:
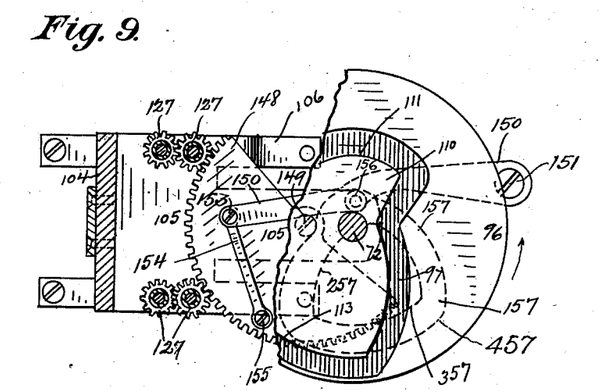
Fig. 9 is a vertical section through a part of the machine on the line 9—9 of Fig. 1, the parts being in side elevation.
Figure 24:
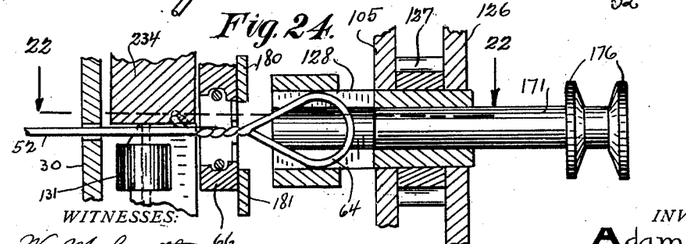
Fig. 24 is a vertical longitudinal section on the line 24—24 of Fig. 22.

This movement is caused by the part 266 of the inner cam surface shown in Fig. 14. When the plate 199 is moved to the right from the position shown in Fig. 14, the outer cam surface on projection 366 forces the bars 162 toward each other, as shown in Fig. 11, and that disengages the rollers 131 from the wires 52. Then the loops 152 and 252 are twisted, as has been explained. In the further movement to the right of the plate 199 the inner cam surface 466 again spreads the bars 162 and forces the levers 132 into the cutting position, that is, into position to cause the wire 52 to be severed between the loops 152 and 252, after they have been twisted, as shown in Fig. 22. When the roller 131 is moved away and disengaged from the wire 52 and the loop twisted, as has been explained, the portion of the wire, which is shown surrounding the roller 131 in Fig. 20, will be drawn up in the position shown in Fig. 22 so as to cross the cutting extension 232 on the lever 132, which coöperates with the cutting projection 234 on the cutter block 134. These two parts assume the position shown in the lower portion of Fig. 14, where, assuming a wire to be laid longitudinally of said figure and between said cutting members 232 and 234, and the lever 132 to be pressed downwardly like a member of a pair of shears, it is obvious that the wire would be severed, as shown in Fig. 22. The relative positions of the two parts 232 and 234 are also indicated in Fig. 24. After the wire 52 has been severed in the manner just explained, the loops 64 having been previously formed, it is necessary to discharge said loops from the twisters, and that is done by plungers 170 and 171. The upper loop 64, as shown in Fig. 22, then becomes the free end of the baling wire that is coiled on the spool and to be used for tying the next bale. The lower loop 64 may be termed the rear end of the wire for tying the preceding bale, and extends through the front loop 64 or the free end of the baling wire prior to the severing of the wires just explained. This arrangement is shown in Fig. 22. The plungers 170 are actuated by the plates 173, which are pivoted at 174 to the frame 104, see Figs. 7 and 8. The free end of said plate is bifurcated and fits astride the plungers between the collars 176, see Figs. 6 and 25. Said plate 173 is actuated by the inclined cam projection 177 on plate 99, which engages a tongue 178 on the plate 173. The position preceding the actuating of the plate 173 is indicated in Figs. 7 and 8. When the plate 99 is pushed to the right from the position shown in said figures, the projection 177 will crowd the plate 173 inwardly and thereby actuate the plungers and on the return movement of the plate the projection 177 engages the tongue 178, and the plate 173 and the plungers are returned to the normal position shown in Figs. 7 and 8.

Figure 25:
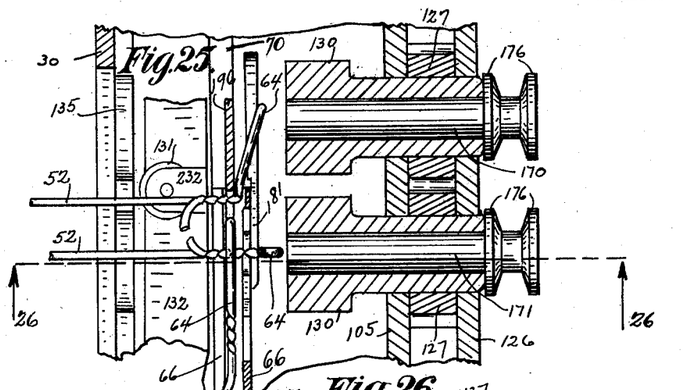
Fig. 25 is a horizontal longitudinal section through the twisting mechanism showing the same in an advanced stage as compared with Fig. 22, the same being a section on the line 25—25 of Fig. 26.
Figure 26:
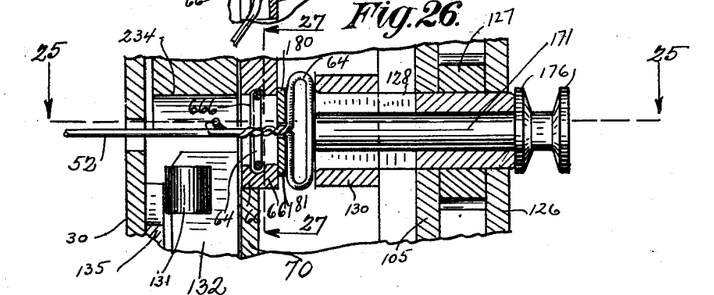
Fig. 26 is a vertical longitudinal section on the line 26—26 of Fig. 25.
Figure 27:
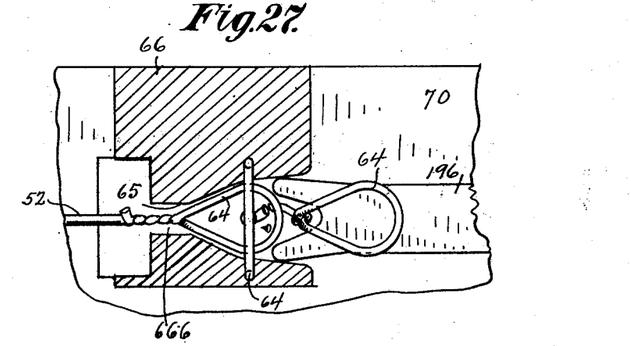
Fig. 27 is a transverse vertical section on the line 27—27 of Fig. 26.

It is necessary that the lower one of the loops 64 shown in Fig. 22 be flattened, as shown in Fig. 26, in order to effect the tie with the loop 64 on the other end of the other section of the wire that has been severed from the main part of the wire 52. In order to widen said loop 64 bars 180 and 181 must be brought toward each other to furnish a base against which the loop may be pressed and mashed by the plunger 171. The bars 180 and 181 are indicated in the upper right-hand portion of Fig. 14. They are pivoted at one end on pins 182 in the plate 70, see Fig. 15. The bars 180 and 181 have between their ends pins 183 which project into slots 184 in plates 185 and 186, which are parallel and connected by plate 187 in a single rigid frame. The plates 185 have guide slots 188, which run on pins 189 in the plate 70. The plates 185 and 186 are actuated by a lever 190, which is fulcrumed to the plate 70 by a pin 191 located between the ends of said lever. The upper end of said lever is slotted to form two projections or fingers that extend astride the pin 192 secured to the plate 187, and the lower end of said lever 190 has a horizontal arm 193 which rides on a pin 194, which is secured in the plate 199, but since said plate 199 is moved along with the plate 99 by means heretofore described from the position shown in Fig. 14 to the right, the pin 194 will engage the arm 195 extending down from the lever 190 and throw the lower end of said lever to the right and the upper end to the left. That will cause the movement of the plates 185 and 186 to the left, and thereby the bars 180 and 181 will be forced together toward each other against the intervening wire 52, from the position shown in Fig. 24 to the position shown in Fig. 26. Then when the plunger 171 moves to the position shown in Fig. 26, it will press down the loop 64, as there shown. The two looped ends of the cut wire are then in the position shown in Fig. 27, and as the bale around which said wire extends is crowded forward, the bale will pull the looped ends out of the part shown in Fig. 27 and out of the twister altogether, and in doing so the side wall 65 of the block 66, as shown in Fig. 27, will cause one of the loops there shown to be pressed together and thus complete the tie, for then the other loop, the one which appears in elevation in Fig. 26, cannot escape through the loop which has just been pressed together by the side wall 65 of block 66. When the same have been pulled out far enough to bring the widened loop 64 opposite the enlarged end of the slot 464, see Figs. 23 and 27, the tie can escape through the side wall 30 of the frame of the device. As the tied ends of the wire of the finished bale pass out in the manner just explained, the looped end of the succeeding wire is pushed from the position shown in Fig. 22 into the block 66, see Figs. 14, 22 and 27 by the forked bar 196, which is secured to the plate 187 and moves therewith. Said looped wire is then in the position shown in the upper part of Fig. 25 and is held in that position while the succeeding bale is being formed. With the end of the wire running from the reels held as just explained, and with the upper and lower wires extending transversely across the baling compartment, the hay is pressed forwardly in portions by the plunger until another bale is formed, and as the bale is formed its forward end pushes forwardly against said wires, carrying the wires with them. While the bale is forming the twisting and tying mechanism is idle, the clutch connecting shafts 75 and 80 being in the position shown in Fig. 17. The twisting and tying mechanism is thrown into operation after the bale is formed by a star wheel 200 which is mounted in a bracket 201 on a frame 30, said wheel being horizontal and projecting into engagement with a bale, see Figs. 1 and 2, so that the bale as it moves will cause a corresponding movement of the wheel 200. The construction here is such that the wheel 200 will cause the tying mechanism to operate at the end of each revolution of said wheel. Hence the length of the bale which will be formed by this machine will equal the circumference of the wheel 200, and if the size of the bale is desired to be varied, it can be done by substituting wheels 200 of different diameters. The wheel 200 has a pin 202 projecting upwardly from it, as shown in Figs. 16 and 17, which pin at each revolution engages the projection 203 secured on the rod 204, which is slidably mounted in bearings 205 and is connected with the wire 95. The movement of the rod 204 to the left from the position shown in Fig. 17 will actuate the bell crank 93 and lift the pin 90 from between the rider 86 and the clutch member 78, and then the spring 89 will throw the pin 85 through the clutch member 78 into engagement with the clutch member 79, and the two shafts 75 and 80 will be locked together for one revolution, whereupon the clutch is disengaged in the manner heretofore explained.

The general features of the mode of operation of the device will now be explained, as many of the details of said operation have been indicated in the preceding description of the construction.

The plunger operates all the time and when a bale is large enough, the tying mechanism is thrown into operation and that causes the needles to pass transversely through the frame of the machine and carry the wires into the tying mechanism. Means for holding the wires is provided in the tying mechanism and the advancing bale is forced against said wires by the plunger. The movement of the needles through the frame and back again occurs while the plunger is at or near its forward limit of movement, and the complete operation of the tying mechanism occurs by the time the plunger reaches its limit of movement.

The sequence of the operation of the parts of the twisting mechanism will be explained by reference to the cam wheel 96, as shown in Fig. 6. The outer cam surface from the point 114 to the point 115 causes the needles to move in through the pressing chamber of the machine and carries the wires into the twisting mechanism, as shown in Fig. 20. During this movement of the needles and before they reach their inward limit of movement, the roller 131 has been moved into the position shown in Fig. 20 ready to catch the wire 52. During the same time the plungers 170 and 171 are returned from their actuated position, as indicated in Figs. 25 and 26 to the position shown in Fig. 20, and also the frame, consisting of the plates 185, 186 and 187, is returned to the position shown in Fig. 14, thus separating the plates 180 and 181. This prepares the parts so that the needles can pass through the block 66 in reaching the twisters. At the end of said operation the wires are clamped by the clamping bars 135 and blocks 134, as shown in Fig. 12. The inner cam surface from the point 115 to the point 110 will cause a partial return of the needles and cause the rollers 131 to move out of the position shown in Fig. 20 so as to give the wire slack. In the latter part of this movement the twisters begin to operate and the twisting continues while the concentric surface 111 is in engagement with the pin 98 of the plate 99, although during that part of the operation the plate 99 is stationary. The inner cam surface from the curved portion 111 to the point 112 still further actuates the plate 99 to the right and causes the operation of the cutters for severing the wires and then the plungers 170 and 171 are caused to operate for forming the loops and effecting the tie, and the forked plate 196 moves the other loop into the block 66. During this part of the operation the complete return movement of the needles is effected. During this operation also the clamps 135 release the wires. The long concentric cam surface 113 causes no movement of the frame 99, and during the latter portion of the operation of the parts the twisters are returned to their normal position. This latter movement is caused by the cam groove shown in Fig. 9.

What I claim as my invention and desire to secure by Letters Patent is:

1. A baling press including means for forming a twisted loop on both ends of the baling wire, means for inserting the loop on one end of the baling wire through the other loop, and means for securing said loops together.

2. A baling press including means for forming a twisted loop on the free end of the baling wire, means for holding the same, means for inserting the other end of the baling wire through said loop, means for twisting the inserted end of the baling wire into a loop, and means for pressing said loops so as to interlock them.

3. A baling press including means for forming a twisted loop on the free end of the baling wire, means for holding the same, means for inserting the other end of the baling wire through said loop, means for twisting the inserted end of the baling wire into a loop, means for flattening one of said loops, and means for elongating said other loop, whereby the two loops will interlock.

4. A baling press including a frame, a reel on one side of the frame for holding the baling wires, means on the other side of the frame for forming a twisted loop on the free end of the baling wire, means with a contracted recess in which said loop is held, a plunger for forcing the material to be pressed against said wire until a bale is formed, means for inserting the other end of the baling wire through said loop, means for twisting the inserted end of the baling wire into a loop, and means for flattening said last-mentioned loop, whereby as the bale moves said looped wires will be drawn out of said holding means and its first-mentioned loop pressed into locking engagement with the latter loop by said holding means as it is drawn therefrom.

5. A baling press including a twister for forming a twisted loop on the free end of the wire, means for holding said loop in advance of and in line with said twister, a needle adapted to carry the other end of said wire through said loop and into said twister whereby it is twisted into a loop, and means for flattening said loops together to cause them to interlock.

6. A baling press including a frame, a reel on one side thereof for carrying the wire, means for fixedly holding the free end of the wire, a needle with two forwardly projecting fingers adapted to carry said wires through the compressing chamber of the machine, means for engaging the wire between the fingers of the needle as they are moving, whereby two loops are formed in the wire, means for severing the wire between said loops, and means for twisting said loops, whereby a twisted loop will be formed on the end of the severed wire and the end of the portion of the wire running from the reel.

7. A baling press including a frame, a reel at one side thereof for carrying the wire, means for forming a loop in the free end of the wire, means for fixedly holding said loop, a needle with two forwardly projecting fingers adapted to carry said wire through the pressing chamber of the machine and one of said fingers adapted to carry the wire through said loop, means for engaging the wire between the fingers of the needle and before reaching said loop, whereby two loops are formed in said twisted loop, means for simultaneously twisting both loops, and means for severing the wires between said two twisted loops.

8. A baling press including a frame, a reel at one side thereof for carrying the wire, means for forming a loop in the free end of the wire, means for fixedly holding said loop, a needle with two forwardly projecting fingers adapted to carry said wire through the pressing chamber of the machine and one of said fingers adapted to carry the wire through said loop, means for engaging the wire between the fingers of the needle and before reaching said loop, whereby two loops are formed in said twisted wire, means for simultaneously twisting both loops, means for severing the wires between said two twisted loops, and means for interlocking said first twisted loop with its inserted twisted loop.

9. A baling press including a frame, a reel at one side thereof for carrying the wire, means for forming a loop in the free end of the wire, means for fixedly holding said loop, a needle with two forwardly projecting fingers adapted to carry said wire through the pressing chamber of the machine and one of said fingers adapted to carry the wire through said loop, means for engaging the wire between the fingers of the needle and before reaching said loop whereby two loops are formed in said twisted wire, means for simultaneously twisting both loops, means for severing the wires between said two twisted loops, means for interlocking said first twisted loop with its inserted twisted loop, and means for moving the twisted loops remaining on the end of the unsevered wire into position to be fixedly held.

10. A baling press including a frame, a reel on one side thereof for carrying the wire, means for fixedly holding the free end of the wire, a needle with two forwardly projecting fingers adapted to carry said wires through the compressing chamber of the machine, means for engaging the wire between the fingers of the needle as they are moving whereby two loops are formed in the wire, means for removing said wire engaging means, means for severing the wire between said loops, and means for twisting said loops, whereby a twisted loop will be formed on the end of the severed wire and the end of the portion of the wire running from the reel.

11. A baling press including a frame, a reel on one side thereof for carrying the wire, means for fixedly holding the free end of the wire, a needle with two forwardly projecting fingers adapted to carry said wires through the compressing chamber of the machine, means for engaging the wire between the fingers of the needle as they are moving whereby two loops are formed in the wire, means for severing the wire between said loops, tubular twisters into the end of which the wire loops are inserted by the needles, means for simultaneously revolving said twisters for twisting said loops, and plungers in said twisters for discharging the twisted loops therefrom.

12. A baling press including a frame, a reel on one side thereof for carrying the wire, means for fixedly holding the free end of the wire, a needle with two forwardly projecting fingers adapted to carry said wires through the compressing chamber of the machine, means for engaging the wire between the fingers of the needle as they are moving whereby two loops are formed in the wire, means for severing the wire between said loops, tubular twisters into the end of which the wire loops are inserted by the needles, means for simultaneously revolving said twisters for twisting said loops, plungers in said twisters for discharging the twisted loops therefrom, and a pair of plates movable toward each other behind the loop twisted on the ends of the severed wire preceding the action of the plungers, whereby said loop will be flattened by the plunger.

13. A baling press including means for forming a twisted loop on the free end of the baling wire, means for holding the same, means for inserting the other end of the baling wire through said loop, means for twisting the inserted end of the baling wire into a loop, means for pressing said loops so as to interlock them, a cam for controlling the operation of said holding means, and a cam wheel for controlling the sequence of said other parts.

14. A baling press including means for forming a twisted loop on the free end of the baling wire, means for inserting the other end of the baling wire through said loop, means for securing said inserted end of the baling wire to said loop, a reciprocable frame adapted to cause the actuation of all of said parts, and a cam wheel for reciprocating and regulating the movement of said frame and which thereby controls the operation of said parts.

15. A baling press including means for holding a plurality of wires which consists of a pair of oppositely located blocks, a pair of intermediate holding members which are pivoted at one end, toggle links pivoted to said intermediate holding members, a reciprocating bar between said intermediate holding members to which said toggle links are pivoted, and means for reciprocating said bar, substantially as set forth.

16. A baling press including a needle provided with two separated fingers at the end thereof which are adapted to carry the wire through the baling chamber, a stationary plate perforated so that the wire will be carried through said perforations by the needle, a lever pivoted at one end with a central projection on each side of which the needle fingers pass, whereby said projection engages the baling wire between the needle fingers so that each needle finger will form a loop in said wire, means for twisting each loop, a bar pivoted to said plate at one end and to the free end of said lever at the other end, a pin extending through a slot in said bar, and a sliding plate provided with a cam surface for engaging said pin for operating said lever so as to disengage the projection thereof from the baling wire prior to the twisting thereof.

17. A baling press including means for cutting a plurality of wires which consists of a plate, a plurality of oppositely positioned blocks, a lever pivoted at one end to each block, each pair of levers and blocks having coacting cutting edges when the lever is moved against the block, a pair of parallel bars pivoted at one end to said plate and pivoted at the other end to the free ends of said levers, pins extending from said bars through a slot in said plate, and a sliding plate provided with cam surfaces to engage said pins for causing the movement of said bars toward and away from each other.

18. A baling press including a needle provided with two separated fingers at the end thereof which are adapted to carry the wire through the baling chamber, a stationary plate perforated so that the wire will be carried through said perforations by the needle, a block secured to said plate with a cutting projection, a lever pivoted to said block with a projection therefrom adapted to register with said cutting projection on the block and on each side of which the fingers of the needle pass and carry the baling wire, a bar pivoted at one end of said plate and at the other end to the free end of said lever, a pin projecting from said bar, and a sliding plate provided with cam surfaces adapted to give said bar two movements one of said movements to move the lever so as to bring the projection thereof in the path of the wire carried by the needle fingers to cause said needle fingers to form a pair of loops in the wire and then to remove said lever and thereafter to again actuate said lever to bring the cutting edge thereof in cutting relation to the cutting projection of said block whereby the wire will be severed.

In witness whereof, I have hereunto affixed my signature in the presence of the witnesses herein named.

ADAM HEIM.

Witnesses:
G. H. BOINK,
J. H. WELLS.

Copies of this patent may be obtained for five cents each, by addressing the "Commissioner of Patents, Washington, D. C."